United States Patent [19]

Fujibayashi

[11] Patent Number: 4,536,808
[45] Date of Patent: Aug. 20, 1985

[54] TAPE RECORDER DEVICE HAVING AN AUTOMATIC SHUT-OFF CIRCUIT
[75] Inventor: Kenji Fujibayashi, Tokyo, Japan
[73] Assignee: Olympus Optical Co., Ltd., Tokyo, Japan
[21] Appl. No.: 478,072
[22] Filed: Mar. 23, 1983
[30] Foreign Application Priority Data
  Apr. 2, 1982 [JP] Japan ............................. 57-47817[U]
[51] Int. Cl.³ ........................ G11B 15/48; G11B 15/18
[52] U.S. Cl. .................................... 360/74.2; 360/69; 360/71
[58] Field of Search ............................. 360/74.1–74.7, 360/69, 71; 318/6, 466; 361/236, 239, 241
[56] References Cited
  U.S. PATENT DOCUMENTS
  3,583,617  6/1971  Kosaka ............................... 360/74.7
  4,322,765  3/1982  Furuta ................................ 360/74.1
  4,413,290 11/1983  Furuta ................................ 360/74.1

Primary Examiner—Raymond F. Cardillo, Jr.
Assistant Examiner—Steven R. Garland
Attorney, Agent, or Firm—Frishauf, Holtz, Goodman & Woodward

[57] ABSTRACT

A tape recorder wherein a control transistor is connected between a power source and a load circuit involving, for example, a motor circuit, mechanism control circuit and amplifier; and automatic shut-off circuit is connected in parallel to the load circuit. The automatic shut-off circuit is arranged to render the control transistor conductive at the time of power supply; and nonconductive when a terminal end of the tape is detected. A single-pole double-throw switch is provided which is only required to have a small current capacity, and has a movable contact connected to a power source, a first stationary contact connected to the voltage-detecting terminal of the automatic shut-off circuit and a second stationary contact connected to the base of the control transistor.

1 Claim, 3 Drawing Figures

F I G. 3
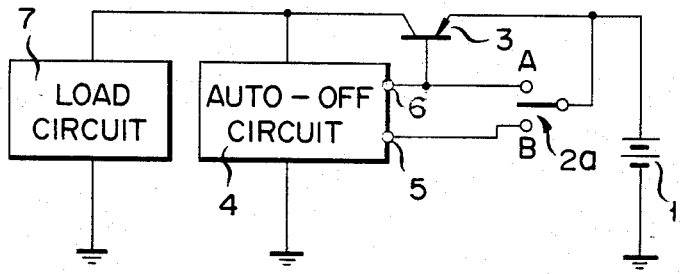

TAPE RECORDER DEVICE HAVING AN AUTOMATIC SHUT-OFF CIRCUIT

BACKGROUND OF THE INVENTION

This invention relates to a tape recorder device, and more particularly, to a tape recorder having an automatic shut-off circuit.

A tape recorder is generally provided with an automatic shut-off circuit to stop the power supply to a load circuit involving, for example, a motor circuit and mechanism operation-control circuit, when a terminal end of a magnetic tape, or the termination of tape reel rotation is detected. When a power switch is thrown, the automatic shut-off circuit actuates a control transistor provided between the power switch and load circuit, and deenergizes the control transistor upon detection of the termination of the reel rotation.

When the power switch of a tape recorder arranged as described above is closed, a relatively large current flows, such as the start current of a motor or the charge current of amplifier capacitors. Consequently, it is necessary to provide a power switch having a large current capacity. This requirement presents difficulties in miniaturizing the power switch, and thus, the tape recorder.

SUMMARY OF THE INVENTION

It is accordingly an object of this invention to provide a tape recorder device which enables an automatic shut-off circuit to be effectively controlled by a switch having even a small current capacity.

To attain the above-mentioned object, according to this invention, a single-pole double-throw switch is provided which has its movable contact connected to a power source, its first stationary contact connected to a voltage detection terminal of an automatic shut-off circuit, and its second stationary contact connected to the base of a control transistor which is connected between the load circuit and power source.

BRIEF DESCRIPTION OF THE DRAWINGS

FIG. 3 indicates the arrangement of a tape recorder device embodying this invention.

DETAILED DESCRIPTION OF THE PREFERRED EMBODIMENT

In order to better understand the tape recorder device of this invention, description will first be given of a conventional tape recorder device.

Figure 1:
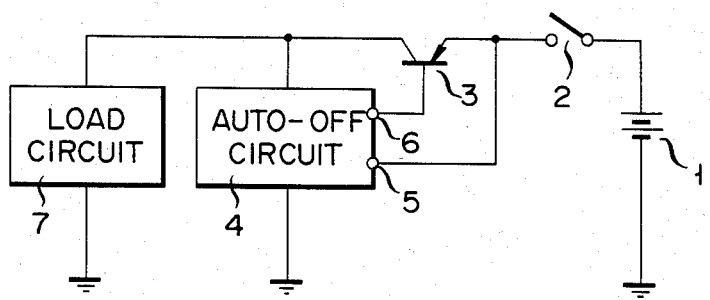
FIG. 1 shows the arrangement of a conventional tape recorder device having an automatic shut-off circuit.

FIG. 1 shows the arrangement of a conventional tape recorder having an automatic shut-off circuit. A power source 1 is connected to the emitter of a control transistor 3 through a power supply switch (pause switch) 2. An auto-off circuit 4 and a load circuit 7 involving, for example, a motor circuit, amplifier circuit and display circuit are connected in parallel to the collector (output side) of the control transistor 3.

The automatic shut-off circuit 4 has a voltage detection terminal 5 connected to the output terminal of the power switch 2 and an output terminal 6 connected to the base of the control transistor 3.

The automatic shut-off circuit 4 is arranged to detect a power supply voltage suddenly impressed on the voltage detection terminal 5 when the switch 2 is closed, and to actuate the control transistor 3 through the output terminal 6. As a result, the power supply voltage is impressed on the automatic shut-off circuit 4 and load circuit 7 (pause release). When detecting the terminal end of the tape or the termination of a reel rotation, the automatic shut-off circuit 4 deenergizes the control transistor 3 through the output terminal 6. When the power switch 2 is opened the power supply voltage ceases to be supplied to the automatic shut-off circuit 4 and load circuit 7 (pause condition).

Figure 2:
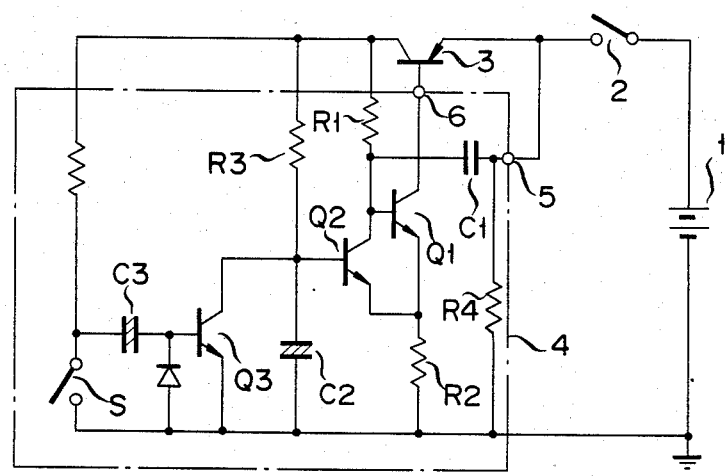
FIG. 2 illustrates an example of the automatic shut-off circuit of FIG. 1.

FIG. 2 indicates the arrangement of a conventional automatic shut-off circuit. A transistor Q1 and resistors R1, R2 constitute, together with the control transistor 3, a self-holding circuit. When the switch 2 is closed, a pulse is supplied to the base of the transistor Q1 through a capacitor C1 to energize the transistor Q1, causing an emitter current to flow through the control transistor 3. When the control transistor 3 is thus energized the base current of the transistor Q1 is applied through the resistor R1, causing the transistors 3 and Q1 to remain conductive. A transistor Q2 is used to release the self-holding condition. When the capacitor C2, charged through a resistor R3, has a higher voltage than the emitter voltage of the transistor Q2, this transistor Q2 is rendered conductive to short-circuit the base-emitter path of the transistor Q1. As a result, the transistors Q1 and 3 are rendered nonconductive. The transistor Q3 controlling the discharge of the capacitor C2 has its operation controlled by a reel rotation-detecting switch S. That is, during the reel rotation, the switch S is periodically turned ON and OFF, and consequently the transistor Q3 used to charge and discharge the capacitor 3 is also periodically rendered conductive and nonconductive. Since the capacitor C2 is alternately charged and discharged, the voltage of the capacitor C2 is prevented from reaching a threshold level. During the reel rotation, therefore, the transistors 3 and Q1 remain conductive. When the reel rotation stops, the capacitor C3 is prevented from being charged (in such case the transistor Q3 is rendered conductive), regardless of whether the switch S is closed or opened. Therefore the transistor Q3 remains nonconductive. Consequently, the voltage of the capacitor C2 rises above the threshold voltage of the transistor Q2, thereby rendering the transistor Q2 conductive and the transistors Q1 and Q3 nonconductive. As a result, power supply to the load circuit 7 terminates. A resistor R4 is provided for discharging the capacitor C1.

With the tape recorder device of this invention, as shown in FIG. 3, a single-pole double-throw switch 2a which is only required to have a small current capacity is used in place of the switch 2 of the conventional tape recorder device of FIG. 1. With the tape recorder device of the invention, the common contact (movable contact) of the switch 2a is connected to the power source 1; a first stationary contact thereof is connected to the voltage-detecting terminal of the automatic shut-off circuit 4; and a second stationary contact thereof is connected to the base of the control transistor 3.

When the switch 2a is thrown to let the common contact be connected to the second stationary contact on the A side, then the control transistor 3 is rendered nonconductive to stop power supply to the auto-off circuit 4 and load circuit 7 (pause condition). Conversely when the switch 2a is thrown to the B side, the power supply source voltage is suddenly impressed on the voltage-detecting terminal 5 of the auto-off circuit 4. As a result, the control transistor 3 is energized through the output terminal 6 as described above. As a result, power supply voltage is impressed on the auto-off circuit 4 and load circuit 7 (pause release).

With the tape recorder device of this invention arranged as described above, the switch 2a is used only to effect the energization or deenergization of the control transistor 3, and is allowed to have a small current capacity. Referring to FIG. 3, it is possible to insert a resistor having a sufficiently small resistance to cut off the control transistor 3 between the second stationary contact of the switch 2a and the base of the control transistor 3. The embodiment mentioned above refers to the case where the switch was a power switch. However, it will be noted that the present invention is also applicable to a case where the switch is a pause switch.

What is claimed is:

1. A tape recorder control device comprising:

a control transistor having a collector-emitter path which is connected between a power source and load circuit;

an automatic shut-off circuit connected in parallel with the load circuit on the output side of said control transistor and having a voltage-detecting terminal and an output terminal, said output terminal being connected to a base of said control transistor, said automatic shut-off circuit including:

means responsive to a voltage suddenly impressed on said voltage-detecting terminal for rendering said control transistor conductive through said output terminal; and means responsive to the stopping of rotation of a reel of the tape recorder for rendering said control transistor nonconductive through said output terminal; and a switch having a first stationary contact connected to said voltage-detecting terminal of said automatic shut-off circuit, a second stationary contact connected to the base of said control transistor, and a common contact connected to the power source, said common contact being selectively contactable with one or the other of said first and second stationary contacts.

* * * * *